Figure 1:
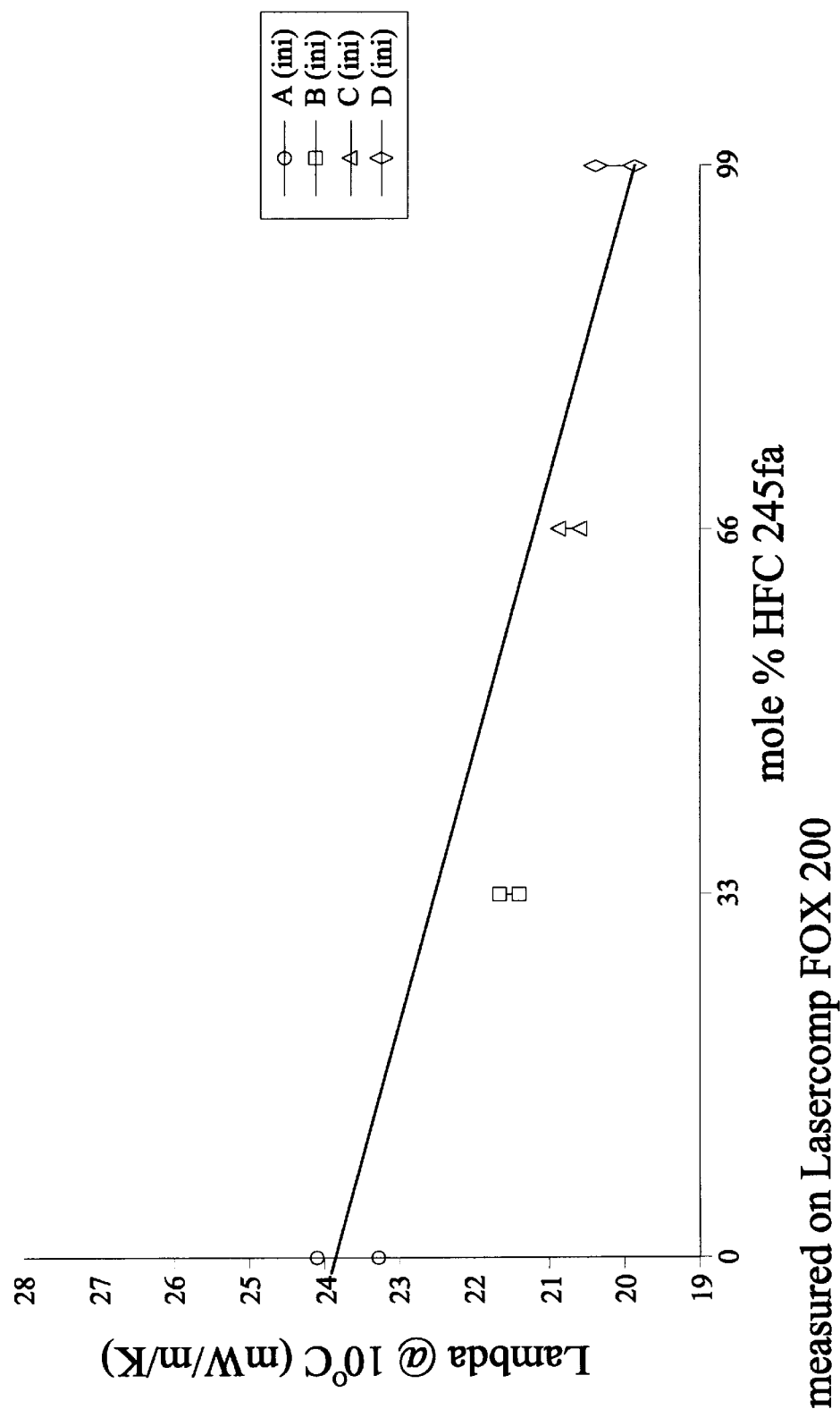

United States Patent
Colman

[11] Patent Number: 6,121,338
[45] Date of Patent: Sep. 19, 2000

[54] PROCESS FOR RIGID POLYURETHANE FOAMS

[75] Inventor: Luc Ferdinand Leon Colman, Belsele, Belgium

[73] Assignee: Imperial Chemical Industries PLC, London, United Kingdom

[21] Appl. No.: 09/159,480

[22] Filed: Sep. 23, 1998

[30] Foreign Application Priority Data

Sep. 25, 1997 [EP] European Pat. Off. ............. 97202952

[51] Int. Cl.[7] ...................................... C08J 9/14
[52] U.S. Cl. ................ 521/131; 510/415; 521/174; 521/115; 252/182.26
[58] Field of Search ............................. 521/131, 174, 521/115; 510/415; 252/182.26

[56] References Cited

U.S. PATENT DOCUMENTS

| | | |
|---|---|---|
| 5,558,810 | 9/1996 | Minor et al. . |
| 5,562,857 | 10/1996 | Werner et al. ............... 521/131 |
| 5,563,180 | 10/1996 | Skowronski et al. ......... 521/131 |
| 5,565,497 | 10/1996 | Godbey et al. ............... 521/131 |
| 5,672,294 | 9/1997 | Lund et al. . |
| 5,677,358 | 10/1997 | Lund et al. ................... 521/131 |
| 5,788,886 | 8/1998 | Minor et al. . |

FOREIGN PATENT DOCUMENTS

97/11990  4/1997  WIPO .

*Primary Examiner*—Morton Foelak
*Attorney, Agent, or Firm*—Pillsbury Madison & Sutro Intellectual Property Group

[57] ABSTRACT

Process for preparing rigid polyurethane or urethane-modified polyisocyanurate foam using as blowing agent a mixture containing from 1 to 50 mole % 1,1,1,3,3-pentafluoropropane and from 50 to 99 mole % isopentane and/or n-pentane.

6 Claims, 2 Drawing Sheets

PROCESS FOR RIGID POLYURETHANE FOAMS

This invention relates to processes for the preparation of rigid polyurethane or urethane-modified polyisocyanurate foams, to foams prepared thereby, and to novel compositions useful in the process.

Rigid polyurethane and urethane-modified polyisocyanurate foams are in general prepared by reacting the appropriate polyisocyanate and isocyanate-reactive compound (usually a polyol) in the presence of a blowing agent. One use of such foams is as a thermal insulation medium as for example in the construction of refrigerated storage devices. The thermal insulating properties of rigid foams are dependent upon a number of factors including, for closed cell rigid foams, the cell size and the thermal conductivity of the contents of the cells.

A class of materials which has been widely used as blowing agent in the production of polyurethane and urethane-modified polyisocyanurate foams are the fully halogenated chlorofluorocarbons, and in particular trichlorofluoromethane (CFC-11). The exceptionally low thermal conductivity of these blowing agents, and in particular of CFC-11, has enabled the preparation of rigid foams having very effective insulation properties. Recent concern over the potential of chlorofluorocarbons to cause depletion of ozone in the atmosphere has led to an urgent need to develop reaction systems in which chlorofluorocarbon blowing agents are replaced by alternative materials which are environmentally acceptable and which also produce foams having the necessary properties for the many applications in which they are used.

Initially, the most promising alternatives appeared to be hydrogen-containing chlorofluorocarbons (HCFC's). U.S. Pat. No. 4,076,644, for example, discloses the use of 1,1-dichloro-2,2,2-trifluoroethane (HCFC-123) and 1,1-dichloro-1-fluoroethane (HCFC-141b) as blowing agents for the production of polyurethane foams. However, HCFC's also have some ozone-depletion potential. There is therefore mounting pressure to find substitutes for the HCFC's as well as the CFC's.

Alternative blowing agents which are currently considered promising because they contain no ozone-depleting chlorine are partially fluorinated hydrocarbons (HFC's) and hydrocarbons (HC's).

One of the most viable HFC candidate is 1,1,1,3,3-pentafluoropropane (HFC-245fa) as described in U.S. Pat. No. 5,496,866 and EP 381989.

In respect of HC's especially five-carbon member hydrocarbons are considered such as isopentane and n-pentane, as described in WO 90/12841.

Currently a lot of attention is paid to blowing agent mixtures, which could, apart from a possible reduction in cost, also provide additional benefits such as foam density reduction and thermal conductivity.

U.S. Pat. No. 5,562,857 describes the use of mixtures containing from 50 to 70 mole % of HFC-245fa and from 30 to 50 mole % isopentane as blowing agent for rigid polyurethane foams.

It is an object of the present invention to provide a novel blowing agent mixture containing no chlorine and therefore of zero ozone depletion potential yielding foams having good thermal insulation and physical properties.

This object is met by using in the process of making rigid polyurethane or urethane-modified polyisocyanurate foams from polyisocyanates and isocyanate-reactive components a mixture containing from 1 to 50 mole % HFC-245fa and from 50 to 99 mole % isopentane and/or n-pentane.

Preferably the mole ratio HFC 245fa/iso- and/or n-pentane is between 10/90 and 40/60.

Preferably on the hydrocarbon side only isopentane or n-pentane is used and most preferably only isopentane. But also mixtures of isopentane and n-pentane can be used; in these mixtures the mole ratio isopentane/n-pentane is preferably between 80/20 and 20/80.

Suitable isocyanate-reactive compounds to be used in the process of the present invention include any of those known in the art for the preparation of rigid polyurethane or urethane-modified polyisocyanurate foams. Of particular importance for the preparation of rigid foams are polyols and polyol mixtures having average hydroxyl numbers of from 300 to 1000, especially from 300 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes.

The present blowing agent mixture is especially suitable for use in isocyanate-reactive compositions containing polyether polyols, especially those derived from aliphatic or aromatic amine containing initiators, especially aromatic ones such as TDA and DADPM. A preferred isocyanate-reactive composition contains from 10 to 75 wt % (based on total isocyanate-reactive components) of aromatic amine initiated polyether polyols.

Suitable organic polyisocyanates for use in the process of the present invention include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates which may be mentioned include the aliphatic diisocyanates such as isophorone diisocyanate, 1,6-diisocyanatohexane and 4,4'-diisocyanatodicyclohexylmethane.

The quantities of the polyisocyanate compositions and the polyfunctional isocyanate-reactive compositions to be reacted will depend upon the nature of the rigid polyurethane or urethane-modified polyisocyanurate foam to be produced and will be readily determined by those skilled in the art.

Other physical blowing agents known for the production of rigid polyurethane foam can be used in small quantities (up to 30 wt % of the total physical blowing agent mixture)

together with the blowing agent mixture of the present invention. Examples of these include dialkyl ethers, cycloalkylene ethers and ketones, (per)fluorinated ethers, chlorofluorocarbons, perfluorinated hydrocarbons, hydrochlorofluorocarbons, other hydrofluorocarbons and other hydrocarbons.

For example a mixture of HFC-245fa, isopentane and cyclopentane can be used.

Analogously to the present invention mixtures of HFC-245fa and other hydrocarbons (preferably linear alkanes) containing from 3 to 7 carbon atoms (such as cyclopentane, isobutane and n-hexane) can be used as blowing agent for rigid polyurethane foams.

Generally water or other carbon dioxide-evolving compounds are used together with the physical blowing agents. Where water is used as chemical co-blowing agent typical amounts are in the range from 0.2 to 5%, preferably from 0.5 to 3% by weight based on the isocyanate-reactive compound.

The total quantity of blowing agent to be used in a reaction system for producing cellular polymeric materials will be readily determined by those skilled in the art, but will typically be from 2 to 25% by weight based on the total reaction system.

In addition to the polyisocyanate and polyfunctional isocyanate-reactive compositions and the blowing agents, the foam-forming reaction mixture will commonly contain one or more other auxiliaries or additives conventional to formulations for the production of rigid polyurethane and urethane-modified polyisocyanurate foams. Such optional additives include crosslinking agents, for examples low molecular weight polyols such as triethanolamine, foam-stabilising agents or surfactants, for example siloxane-oxyalkylene copolymers, urethane catalysts, for example tin compounds such as stannous octoate or dibutyltin dilaurate or tertiary amines such as dimethylcyclohexylamine or triethylene diamine, isocyanurate catalysts such as quaternary ammonium salts or potassium salts, fire retardants, for example halogenated alkyl phosphates such as tris chloropropyl phosphate, and fillers such as carbon black.

Isocyanate indices of from 70 to 140 will typically be used in operating the process of the present invention but lower indices may be used, if desired. Higher indices, for example 150 to 500 or even up to 3000 may be used in conjunction with trimerisation catalysts to make foams containing isocyanurate linkages. These higher index foams are usually made using polyester polyols as isocyanate-reactive material.

In operating the process for making rigid foams according to the invention, the known one-shot, prepolymer or semi-prepolymer techniques may be used together with conventional mixing methods and the rigid foam may be produced in the form of slabstock, mouldings, cavity fillings, sprayed foam, frothed foam or laminates with other materials such as hardboard, plasterboard, plastics, paper or metal.

It is convenient in many applications to provide the components for polyurethane production in pre-blended formulations based on each of the primary polyisocyanate and isocyanate-reactive components. In particular, many reaction systems employ a polyisocyanate-reactive composition which contains the major additives such as the blowing agent and the catalyst in addition to the polyisocyanate-reactive component or components.

Therefore the present invention also provides a polyisocyanate-reactive composition comprising the present blowing agent mixture.

The various aspects of this invention are illustrated, but not limited by the following examples.

The following reaction components are referred to in the examples:

Polyol 1: a sucrose initiated polyether polyol of OH value 495 mg KOH/g.

Polyol 2: an aromatic amine initiated polyether polyol of OH value 310 mg KOH/g.

Polyol 3: an aromatic amine initiated polyether polyol of OH value 500 mg KOH/g.

Polyol 4: a glycerol initiated polyether polyol of OH value 55 mg KOH/g.

Arconate 1000: propylene carbonate available from Arco.

L 6900: a silicone surfactant available from Union Carbide.

Polycat 8: an amine catalyst available from Air Products.

Desmorapid PV: an amine catalyst available from Bayer.

isopentane: 99.7% pure isopentane available from Halterman.

HFC-245fa: 1,1,1,3,3-pentafluoropropane available from PCR.

RUBINATE M: polymeric MDI available from Imperial Chemical Industries.

RUBINATE is a trademark of Imperial Chemical Industries.

EXAMPLE

Rigid polyurethane foams were produced at laboratory scale using a Heidolph RZR 50 type mixing device from the ingredients listed below in Table 1. The following properties were measured on the obtained foam: free rise density measured on cup foams, thermal conductivity (on a sample of core density about 33 kg/m$^3$) according to standard ISO 2581, initial and after ageing at room temperature or at 70° C. and compression strength (in the weakest direction only) (on a sample of core density about 33 kg/m$^3$) according to standard DIN 53421, initial and after ageing for 5 weeks at room temperature (expressed as stress at 10% thickness).

The results are also presented in Table 1.

TABLE 1

| Foam | | A | B | C | D |
| --- | --- | --- | --- | --- | --- |
| Polyol 1 | pbw | 50.0 | 50.0 | 50.0 | 50.0 |
| Polyol 2 | pbw | 26.0 | 26.0 | 26.0 | 26.0 |
| Polyol 3 | pbw | 19.0 | 19.0 | 19.0 | 19.0 |
| Polyol 4 | pbw | 1.5 | 1.5 | 1.5 | 1.5 |
| Arconate 1000 | pbw | 1.5 | 1.5 | 1.5 | 1.5 |
| L 6900 | pbw | 2.5 | 2.5 | 2.5 | 2.5 |
| Polycat 8 | pbw | 2.5 | 2.5 | 2.5 | 2.5 |
| Desmorapid PV | pbw | 0.3 | 0.3 | 0.3 | 0.3 |
| water | pbw | 1.4 | 1.4 | 1.4 | 1.4 |
| isopentane | pbw | 18.5 | 12.4 | 6.2 | 0.0 |
| HFC-245fa | pbw | 0.0 | 11.47 | 22.95 | 34.42 |
| RUBINATE M | pbw | 136.0 | 136.0 | 136.0 | 136.0 |
| Index | % | 110 | 110 | 110 | 110 |
| Free rise density | kg/m$^3$ | 24.5 | 24.0 | 24.3 | 23.9 |
| Lambda value | | | | | |
| Initial at RT | mW/mK | 23.2 | 21.3 | 20.5 | 19.8 |
| After 2 weeks at RT | mW/mK | 23.7 | 21.9 | 21.3 | 20.5 |
| After 3 weeks at RT | mW/mK | 24.3 | 22.4 | 21.8 | 21.3 |
| After 5 weeks at RT | mW/mK | 24.7 | 22.9 | 22.4 | 21.8 |
| Initial at 70° C. | mW/mK | 24.1 | 21.6 | 20.8 | 20.3 |
| After 2 weeks at 70° C. | mW/mK | 26.3 | 23.4 | 22.5 | 21.9 |
| After 3 weeks at 70° C. | mW/mK | 27.4 | 24.8 | 24.1 | 23.4 |
| After 5 weeks at 70° C. | mW/mK | 27.6 | 25.2 | 24.6 | 24.1 |

TABLE 1-continued

| Foam | | A | B | C | D |
|---|---|---|---|---|---|
| Compression strength | | | | | |
| Initial | kPa | 190.5 | 182.3 | 183.2 | 175.1 |
| After 5 weeks at RT | kPa | 174.3 | 174.2 | 165.4 | 152.0 |

Figure 2:
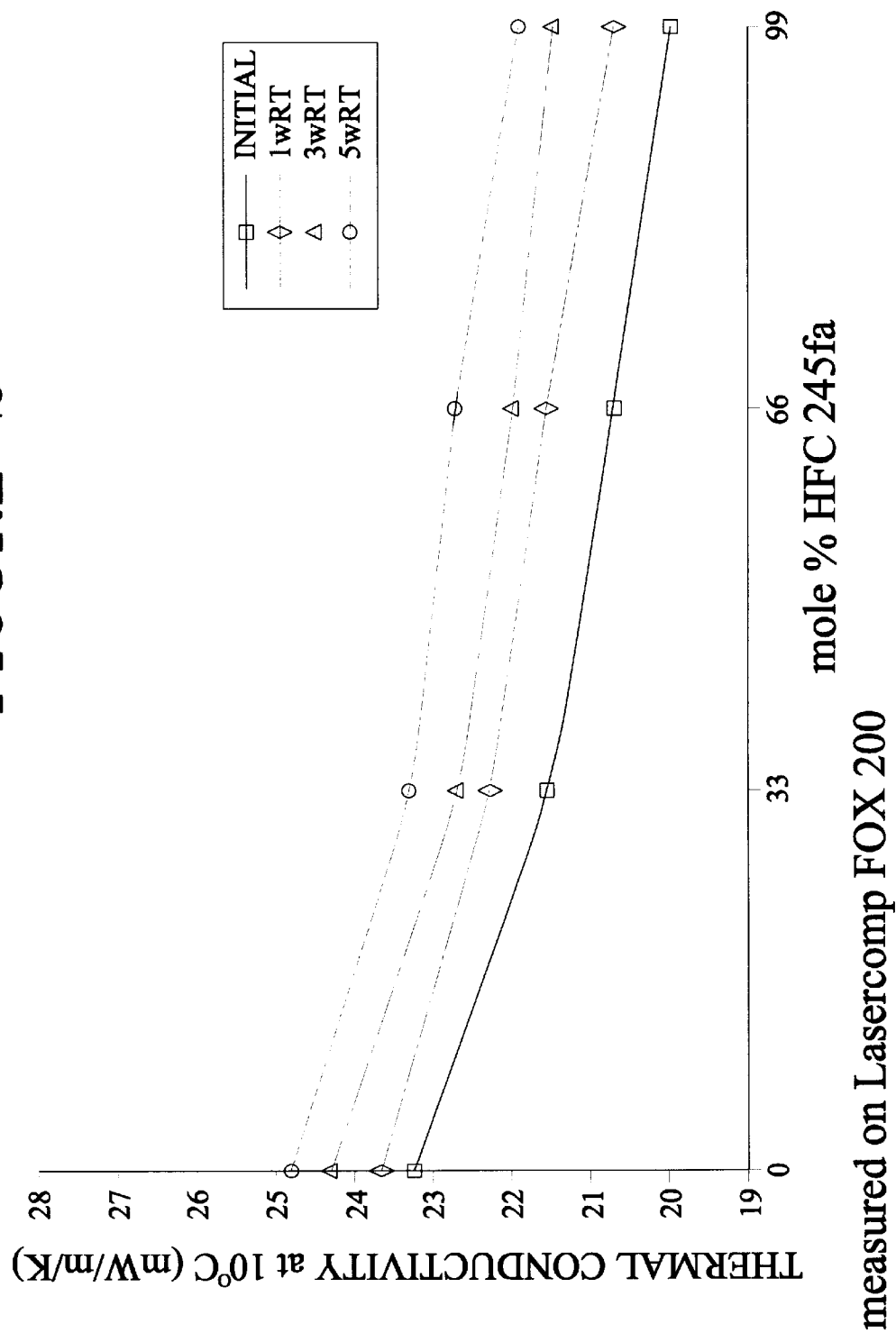

In FIG. 1 the initial lambda is set out as a function of the blowing agent mixture composition. In FIG. 2 the same is set out for the aged lambda (at room temperature).

From FIG. 1 it is clear that the thermal conductivity of the blowing agent mixture is always lower than the mathematical average between the two extremes (expressed by the straight line in FIG. 1). The deviation from the mathematical average is larger for the blowing agent mixture according to the invention (Foam B) than for the blowing agent mixture described in U.S. Pat. No. 5,562,857 (Foam C).

Thus blowing agent mixtures according to the present invention yield foams of comparable thermal insulation value as the foams described in U.S. Pat. No. 5,562,857 although more isopentane is used which inherently has a higher thermal conductivity than HFC-245fa. Also because isopentane is less expensive than HFC-245fa the same performance is obtained at lower cost. Further other physical properties such as compression strength of the foam are not detrimentally affected.

What is claimed is:

1. Polyfunctional isocyanate-reactive composition comprising from 10 to 75 wt % (based on total isocyanate-reactive components) of an aromatic amine initiated polyether polyol, water and a physical blowing agent mixture containing, relative to the total physical blowing agent, from 1 to 50 mole % of 1,1,1,3,3-pentafluoropropane, from 50 to 99 mole % of isopentane and/or n-pentane.

2. Polyfunctional isocyanate-reactive composition according to claim 1 wherein the mole ratio 1,1,1,3,3-pentafluoropropane/iso- and/or n-pentane is between 10/90 and 40/60.

3. Polyfunctional isocyanate-reactive composition consisting essentially of water and a physical blowing agent mixture containing from 1 to 50 mole % of 1,1,1,3,3-pentafluoropropane and from 50 to 99 mole % of isopentane or n-pentane, or a mixture thereof.

4. Polyfunctional isocyanate-reactive composition of claim 3 wherein the mole ratio of 1,1,1,3,3-pentafluoropropane/isopentane or n-pentane, or a mixture thereof is between 10/90 and 40/60.

5. The composition of claim 1, wherein blowing agent includes isopentane and n-pentane in a mole ratio between 80/20 and 20/80.

6. A polyfunctional isocyanate-reactive composition comprising a physical blowing agent mixture containing, relative to the total blowing agent, from 1 to 50 mole % of 1,1,1,3,3-pentafluoropropane, and from 50 to 99 mole % of isopentane and n-pentane.

* * * * *